Patented June 29, 1937

2,085,066

UNITED STATES PATENT OFFICE 2,085,066

AROMATIC MERCURY AMIDES AND PROCESS OF MAKING THE SAME

Carl N. Andersen, Wellesley Hills, Mass., assignor to Lever Brothers Company, a corporation of Maine No Drawing. Application April 18, 1935,
Serial No. 17,062

19 Claims. (Cl. 260—13)

The present invention relates to a method of producing certain new organic mercury compounds, particularly organic mercury derivatives of amides, and to the compounds produced thereby.

It is an object of my invention to produce new organic mercury compounds which may be regarded as derivatives of amides, and which are useful as germicides and for other therapeutic purposes.

The amide group is: —$CONH_2$. I have discovered that when one or both of the amido hydrogen atoms of an amide is replaced by the essential radical of certain aromatic mercury compounds, compounds are produced with extraordinarily high potency as antiseptics and germicides, and at the same time are characterized by relatively low toxicity and other desirable properties.

The compounds I have produced may be described as having the general formula $(RHg)_x.R_1$, in which R represents an aromatic structure, to a carbon atom of which the mercury is directly attached, in which $x$ is an integer, usually 1, but may be more if both of the amido hydrogens are replaced or if the amide contains more than one amido group; and in which $R_1$ is a radical corresponding to a compound having one or more amido groups. While the word "group" is used hereinafter, it is obvious that it is to be understood as plural where the value of $x$ is more than 1.

More particularly, R represents an aromatic structure, which may be an aromatic nucleus with or without side chains, and the expression "aromatic structure" used herein, is intended to be generic and include an aromatic nucleus with or without side chains. The aromatic structure is of the type in which none of the nuclear or side chain carbon atoms has direct linkage with any element other than hydrogen, carbon or mercury. R may stand for the phenyl group, $C_6H_5$, or for an aromatic hydrocarbon having a nucleus similar to the phenyl hydrocarbons, as for example, polycyclic hydrocarbons, in which all of the nuclear carbon atoms, other than the one attached to mercury, and any side chain carbon atoms, have their valences satisfied either by carbon or hydrogen. Examples are the diphenyl, tolyl, xylyl, and naphthyl groups.

The amines containing the —$NH_2$ directly attached to a monovalent radical, do not react readily with aromatic mercury compounds to replace the amino hydrogens. I have discovered, however, due to the negative character of the carbonyl group, the hydrogen atoms of the amido group are more reactive and may be replaced with aromatic mercury radicals.

The amides corresponding to the radical $R_1$ may be either aliphatic or aromatic. Examples of the aliphatic amides are: acetamide, sodium amino succinamide (the amide of the sodium salt of asparagin), sodium adipamide, palmitamide and cyanoacetamide. Examples of aromatic acid amides are: benzamide, meta-sodium sulfonate of benzamide, salicylamide, ortho-sodium and ammonium sulfonates of benzamide, and para-nitrobenzamide. The above examples illustrate amides containing one amido group, one or both of the hydrogens of which may be replaced by an aromatic mercury radical.

My invention includes aromatic mercury derivatives of amides containing more than one amido group. Examples of these amides are: urea and oxamide. In these compounds the hydrogen or hydrogens of one or both of the amido groups may be replaced by an aromatic mercury radical.

Aromatic mercury derivatives of substituted amides are also included within the scope of my invention. Examples of these amides are: Igepon T (oleic amido of ethane sodium sulfonate) and benzanilide.

The expression "amide" as used herein is intended to include both substituted and unsubstituted amides.

The general method of producing my novel compounds consists in reacting together the amide and a compound containing an aromatic mercury radical of the above mentioned type. A common solvent for both the reacting components is employed. If the aromatic mercury compound formed is relatively insoluble as compared with the reacting components, upon precipitation it may be filtered, washed and dried. If the compound is not insoluble, the reacting mixture may be concentrated by evaporation to precipitate the compound.

The aromatic mercury compound I prefer to use in reacting with the amide is the hydroxide. This has the advantage that water is the only other product of the reaction. The resulting compound, therefore, is easily purified. I may also employ a soluble aromatic mercury salt, for example, the acetate, or the lactate, in the reaction with the amide. In general, the aromatic mercury amides produced are of relative low solubility as compared to the aromatic mercury salt, and are relatively insoluble as compared with the original amide.

The following examples are given as illustrative of the process which is comprised in my invention and as illustrative of representative organic mercury derivatives of amides falling within the scope of my invention.

Example 1

17.64 grams of phenylmercury hydroxide is dissolved in 1 liter of water, and heated until solution is complete. The solution is filtered to remove any insoluble material. To the filtrate is added 3.54 grams of acetamide dissolved in 20 cc. of water. The solution remains clear after mixing and is concentrated to one-half its volume. Upon cooling, crystals separate which are removed by filtration, washed well with water and then alcohol and dried. The material sinters at 100° C., and has a melting point of 162° C. It is the compound phenylmercury acetamide.

Example 2

17.64 grams of phenylmercury hydroxide is dissolved in 1 liter of water and heated until solution is complete. The heating is continued until the solution is concentrated to about 500 cc. and is then filtered directly into 200 cc. of alcohol containing 7.26 grams of benzamide. A white milky material separates and the reaction mixture is allowed to cool. The material is separated by filtration, washed well with water and then a few cc. of alcohol, and dried. It sinters at 165° C., and has a melting point of 170.5° C. It is the compound phenylmercury benzamide.

Example 3

7.92 grams of asparagin is dissolved in 200 cc. of alcohol and heated until solution is complete. To this solution is added an alcohol-water solution containing 2.4 grams of sodium hydroxide. To this mixture is added 17.64 grams of phenylmercury hydroxide which has previously been dissolved in 1 liter of water and filtered. The reaction mixture is heated for a few minutes, filtered and allowed to cool. White crystals separate which are removed by filtration, washed and dried. Upon recrystallization from water the material melts at 167.5° C. and is the phenylmercury derivative of the sodium salt of amino succinamic acid.

Example 4

20.64 grams of naphthylmercury hydroxide is dissolved in 1 liter of water and heated until solution is complete. To the solution is added 8.22 grams of salicylamide dissolved in 50 cc. of alcohol. The mixture is agitated and heated for a few minutes, after which it is filtered while hot. On cooling well defined crystals precipitate, which are separated by filtration, washed with alcohol and dried. The material sinters at 160° C., melts to an opaque liquid at 163–164° C. and changes to a clear liquid at 169° C. It is the compound naphthylmercury salicylamide.

Example 5

35.28 grams of phenylmercury hydroxide is dissolved in 1 liter of water and heated until solution is complete. Solution is filtered while hot to removed any insoluble material. To the filtrate is added 5.28 grams of oxamide dissolved in 200 cc. of alcohol. A bulky white precipitate is formed and after the reaction mixture is allowed to cool the precipitate is separated by filtration, washed with water and a few cc. of alcohol and dried. The material decomposes sharply at 267–268° C. and is the compound diphenylmercury oxamide.

Example 6

17.64 grams of phenylmercury hydroxide is dissolved in 1 liter of water and heated until solution is complete. The solution is filtered while hot to remove any insoluble material. To the filtrate is added 11.82 grams of benzanilide dissolved in 200 cc. of alcohol. A bulky white precipitate is formed and the reaction mixture is allowed to cool. The precipitate is removed by filtration, washed with water and a few cc. of alcohol and dried. The material sinters at 138° C., melts at 150–152° C. and is the compound phenylmercury benzanilide.

Example 7

17.64 grams of phenylmercury hydroxide is dissolved in 1 liter of water and heated until solution is complete. The solution is filtered directly into 500 cc. of water in which has been dissolved 25.5 grams of Igepon T (oleic amide of ethane sodium sulfonate). A coarse material precipitates which is removed by filtration, washed well with alcohol and dried. The yield may be increased by concentrating the filtrate on a steam bath after which additional precipitate is formed which is separated by filtration, washed with alcohol and dried. The material sinters at 167° C., browns at 245° C., and does not melt up to 260° C. It is the phenylmercury derivative of Igepon T.

From my investigation of compounds of this type I am led to believe that aromatic mercury derivatives corresponding to all of the amides may be prepared by methods analogous to those described above. I therefore intend my invention to be generic and include the entire group.

From the specific examples it will be obvious to one skilled in the art what procedure is to be followed in producing these other compounds. Theoretical quantities of reacting materials are generally employed. In some cases, if desired, approximately 10% excess of the amide may be used in order to insure complete conversion of the aromatic mercury compound.

The operativeness of the process is not found to depend in any degree upon the temperature at which the reaction is effected. It is convenient to use heat because it facilitates the solubility of the reacting components and speeds the reaction, but the process may be carried out at any temperature, for example, room temperature. If the reacting components are both water soluble, water is used as the solvent for reasons of convenience. The process, however, may be carried out in any solvent in which both the reacting components are soluble. For example, the alcohols or acetone, or mixtures of these with each other or with water may be employed, depending on the solubility of the reacting components. In some instances the solvent employed will determine whether or not there will be water of crystallization in the final compound, but it will not otherwise affect the structure of the compound.

All the compounds produced as above described are characterized by extraordinarily high potency as germicides. Tests to determine the efficacy of some of them in killing B. typhosus and Staph. aureus were carried on under the following conditions.

Aqueous solutions of varying dilutions from 1:10,000 upward until killing ceased, were made up.

These dilutions were employed in the conduct of tests according to the following methods:

Circular 198, U. S. Dept. of Agriculture, Dec. 1931, described as F. D. A. method against *Eberthella typhi* (typhoid bacillus) at 37° C. and F. D. A. special method against *Staph. aureus* at 37° C.

As illustrative of the potency of the compounds, the killing power of the following compounds is given by way of example. The figures represent the maximum dilutions at which killing in 15 minutes resulted:

|  | B. typhosus | Staph. aureus |
|---|---|---|
| Phenylmercury benzamide | 1:60,000 | 1:20,000 |
| Phenylmercury salicylamide | 1:50,000 | 1:20,000 |
| Naphthylmercury salicylamide | 1:135,000 | 1:20,000 |
| Phenylmercury derivative of Igepon T | 1:80,000 | 1:40,000 |
| Phenylmercury sodium metasulfo-benzamide | 1:40,000 | 1:20,000 |

In addition to their high germicidal value, all of these compounds are characterized by relatively low toxicity. Because of these properties it is possible to use them in extreme dilutions and in many situations where known germicides, because of toxic or other undesired properties, cannot be employed. They may be used externally and locally, and in some cases administered internally with satisfactory results from the germicidal standpoint and without harmful effect to the body or its functions.

The compounds retain their germicidal activity when incorporated in soap and various menstruums employed in preparing germicidal compositions.

When these new compounds are to be used directly as germicides they may be employed in aqueous or other solutions or they may be formed into various preparations such as mouth washes, tooth pastes, soaps, ointments, etc.

I claim:

1. The method of preparing aromatic mercury amides wherein an aromatic mercury group is linked to an amido group, which comprises reacting in solution an amide with an aromatic mercury compound of the kind wherein mercury is directly connected to a carbon atom of an aromatic structure in which none of the carbon atoms has direct linkage with any element other than hydrogen, carbon and mercury, whereby the aromatic mercury radical becomes attached to the amido group.

2. The method of preparing aromatic mercury amides wherein an aromatic mercury group is linked to an amido group, which comprises reacting in solution an amide with an aromatic mercury hydroxide of the kind wherein mercury is directly connected to a carbon atom of an aromatic structure in which none of the carbon atoms has direct linkage with any element other than hydrogen, carbon and mercury, whereby the aromatic mercury radical becomes attached to the amido group.

3. The method of preparing phenylmercury amides, which comprises reacting in solution a compound containing an amido group with a phenylmercury compound.

4. The method of preparing phenylmercury amides wherein the phenylmercury group is linked to an amido group, which comprises reacting in solution an amide with phenylmercury hydroxide.

5. A new aromatic mercury compound of the general formula $(RHg)_x.R_1$, in which R represents an aromatic structure to a carbon atom of which the mercury is directly attached and in which none of the carbon atoms has direct linkage with any element other than hydrogen, carbon and mercury; in which $R_1$ represents a radical containing an amido group that is linked to the RHg group through attachment to the nitrogen atom of the amido group and in which $x$ is an integer representing the number of RHg groups attached to the amide, which integer is at least one and not more than twice the number of amido groups in the radical $R_1$.

6. A new aromatic mercury compound of the general formula $(RHg)_x.R_1$, in which R represents an aromatic structure to a carbon atom of which the mercury is directly attached and in which none of the carbon atoms has direct linkage with any element other than hydrogen, carbon and mercury; in which $R_1$ represents a radical corresponding to an aliphatic amide, which radical is linked to the RHg group through attachment to the nitrogen atom of the amido group and in which $x$ is an integer representing the number of RHg groups attached to the amide, which integer is at least one and not more than twice the number of amido groups in the radical $R_1$.

7. A new aromatic mercury compound of the general formula $(RHg)_x.R_1$, in which R represents an aromatic structure to a carbon atom of which the mercury is directly attached and in which none of the carbon atoms has direct linkage with any element other than hydrogen, carbon and mercury; in which $R_1$ represents a radical corresponding to an aliphatic amide containing two amido groups, which radical is linked to the RHg group through attachment to the nitrogen atom of an amido group and in which $x$ is an integer representing the number of RHg groups attached to the amide, which integer is at least one and not more than twice the number of amido groups in the radical $R_1$.

8. A new aromatic mercury compound of the general formula $(RHg)_x.R_1$, in which R represents an aromatic structure to a carbon atom of which the mercury is directly attached and in which none of the carbon atoms has direct linkage with any element other than hydrogen, carbon and mercury; in which $R_1$ represents a radical corresponding to an aromatic amide, which radical is linked to the RHg group through attachment to the nitrogen atom of the amido group and in which $x$ is an integer representing the number of RHg groups attached to the amide, which integer is at least one and not more than twice the number of amido groups in the radical $R_1$.

9. A new aromatic mercury compound of the general formula $(RHg)_x.R_1$, in which R represents an aromatic structure to a carbon atom of which the mercury is directly attached and in which none of the carbon atoms has direct linkage with any element other than hydrogen, carbon and mercury; in which $R_1$ represents a radical corresponding to an aromatic amide having one amido group, which radical is linked to the RHg group through attachment to the nitrogen atom of the amido group and in which $x$ is an integer representing the number of RHg groups attached to the amide, which integer is at least one and not more than twice the number of amido groups in the radical $R_1$.

10. A new aromatic mercury compound of the general formula $(RHg)_x.R_1$, in which R represents an aromatic structure to a carbon atom of which the mercury is directly attached and in which none of the carbon atoms has direct linkage with any element other than hydrogen, carbon and mercury; in which $R_1$ represents a radical containing a substituted amido group, which radical is linked to the RHg group through attachment to the nitrogen atom of the substituted amido group and in which $x$ is an integer representing the number of RHg groups attached to the amide, which integer is at least one and not more than twice the number of amido groups in the radical $R_1$.

11. A new aromatic mercury compound of the general formula $(C_6H_5Hg)_x.R_1$, in which $R_1$ represents a radical containing an amido group that is linked to the $C_6H_5Hg$ group through attachment to the nitrogen atom of the amido group and in which $x$ is an integer representing a number of $C_6H_5Hg$ groups attached to the amide, which integer is at least one and not more than twice the number of amido groups in the radical $R_1$.

12. A new aromatic mercury compound of the general formula $(C_6H_5Hg)_x.R_1$, in which $R_1$ represents a radical corresponding to an aliphatic amide, which radical is linked to the $C_6H_5Hg$ group through attachment to the nitrogen atom of the amido group and in which $x$ is an integer representing a number of $C_6H_5Hg$ groups attached to the amide, which integer is at least one and not more than twice the number of amido groups in the radical $R_1$.

13. A new aromatic mercury compound of the general formula $(C_6H_5Hg)_x.R_1$, in which $R_1$ represents a radical corresponding to an aliphatic amide containing two amido groups, which radical is linked to the $C_6H_5Hg$ group through attachment to the nitrogen atom of an amido group and in which $x$ is an integer representing a number of $C_6H_5Hg$ groups attached to the amide, which integer is at least one and not more than twice the number of amido groups in the radical $R_1$.

14. A new aromatic mercury compound of the general formula $(C_6H_5Hg)_x.R_1$, in which $R_1$ represents a radical corresponding to an aromatic amide, which radical is linked to the $C_6H_5Hg$ group through attachment to the nitrogen atom of the amido group and in which $x$ is an integer representing a number of $C_6H_5Hg$ groups attached to the amide, which integer is at least one and not more than twice the number of amido groups in the radical $R_1$.

15. A new aromatic mercury compound of the general formula $(C_6H_5Hg)_x.R_1$, in which $R_1$ represents a radical corresponding to an aromatic amide having one amido group, which radical is linked to the $C_6H_5Hg$ group through attachment to the nitrogen atom of the amido group and in which $x$ is an integer representing a number of $C_6H_5Hg$ groups attached to the amide, which integer is at least one and not more than twice the number of amido groups in the radical $R_1$.

16. A new aromatic mercury compound of the general formula $(C_6H_5Hg)_x.R_1$, in which $R_1$ represents a radical containing a substituted amido group that is linked to the $C_6H_5Hg$ group through attachment to the nitrogen atom of the substituted amido group and in which $x$ is an integer representing a number of $C_6H_5Hg$ groups attached to the amide, which integer is at least one and not more than twice the number of amido groups in the radical $R_1$.

17. A new aromatic mercury compound of the general formula $(C_6H_5Hg)_x.R_1$, in which $R_1$ represents the radical of salicylamide, to the amido nitrogen of which the $C_6H_5Hg$ group is attached; and in which $x$ is an integer representing one of the numbers 1 and 2.

18. A new aromatic mercury compound of the general formula $(C_6H_5Hg)_2.R_1$, in which $R_1$ represents the radical of oxamide, to which the $C_6H_5Hg$ groups are linked through attachment to amido nitrogen.

19. A new aromatic mercury compound of the general formula $C_6H_5Hg.R_1$, in which $R_1$ represents the radical of oleic amide of ethane sodium sulfonate, to the amido nitrogen of which the $C_6H_5Hg$ group is attached.

CARL N. ANDERSEN.